(12) United States Patent
Noldus

(10) Patent No.: US 9,491,203 B2
(45) Date of Patent: Nov. 8, 2016

(54) SERVICE BASED RELEASE OF A SUBSCRIBER REGISTRAR SERVER FROM A SIGNALLING PATH IN AN INTERNET PROTOCOL COMMUNICATION NETWORK

(75) Inventor: Rogier August Caspar Joseph Noldus, Goirle (NL)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 310 days.

(21) Appl. No.: 13/824,676

(22) PCT Filed: Oct. 1, 2010

(86) PCT No.: PCT/EP2010/005993
§ 371 (c)(1),
(2), (4) Date: Mar. 19, 2013

(87) PCT Pub. No.: WO2012/041354
PCT Pub. Date: Apr. 5, 2012

(65) Prior Publication Data
US 2013/0188633 A1  Jul. 25, 2013

(51) Int. Cl.
*H04L 29/06* (2006.01)

(52) U.S. Cl.
CPC ....... *H04L 65/1069* (2013.01); *H04L 65/1006* (2013.01)

(58) Field of Classification Search
None
See application file for complete search history.

(56) References Cited

U.S. PATENT DOCUMENTS

| 7,653,081 B2* | 1/2010 | Cannon ........................... 370/465 |
| 8,001,233 B2* | 8/2011 | Lybeck ................... H04L 29/06 709/224 |
| 2004/0199649 A1* | 10/2004 | Tarnanen et al. ............. 709/230 |

(Continued)

FOREIGN PATENT DOCUMENTS

| CN | 101002491 A | 7/2007 |
| FR | 2907294 A1 | 4/2008 |
| WO | 2006016839 A1 | 2/2006 |

OTHER PUBLICATIONS

Rosenberg, J. et al., "SIP: Session Initiation Protocol", Network Working Group Request for Comments: 3261, Obsoletes: 2543, Category: Standards Track, Jun. 1, 2002, pp. 1-270, The Internet Society.

(Continued)

*Primary Examiner* — Noel Beharry
*Assistant Examiner* — Wilfred Thomas
(74) *Attorney, Agent, or Firm* — Coats & Bennett, PLLC

(57) ABSTRACT

A method of and servers for establishing a signalling path (20) for a communication session between a calling party (2) and a called party (11) in an Internet Protocol, IP, communications network. The signalling path (20) between the calling party (2) and the called party (11) is established via at least one subscriber registrar server (32) and at least one application server (30) invoking at least one service for the communication session. Dependent on the type of service, if capable for taking over control of the communication session, the at least one subscriber registrar server (32) may be at least partly released from the signalling path (20) for the at least one invoked service.

15 Claims, 9 Drawing Sheets

(56) References Cited

U.S. PATENT DOCUMENTS

| | | | |
|---|---|---|---|
| 2005/0083974 A1* | 4/2005 | Mayer | H04L 45/00 370/474 |
| 2006/0056392 A1* | 3/2006 | Wang | 370/352 |
| 2007/0014281 A1* | 1/2007 | Kant | 370/352 |
| 2007/0070948 A1* | 3/2007 | Kezys | H04L 12/6418 370/331 |
| 2008/0253390 A1* | 10/2008 | Das | H04L 12/5695 370/465 |
| 2009/0036128 A1* | 2/2009 | Raguparan | H04W 36/0033 455/436 |
| 2010/0238928 A1* | 9/2010 | Prouvost et al. | 370/392 |

OTHER PUBLICATIONS

3rd Generation Partnership Project, "IP Multimedia Subsystem (IMS); Stage 2", Technical Specification Group Services and System Aspects, Mar. 2007, 3GPP TS 23.228 V8.0.0, Stage 2, (Release 8).

3rd Generation Partnership Project, "IP multimedia call control protocol based on Session Initiation Protocol (SIP) and Session Description Protocol (SDP)", Technical Specification Group Core Network and Terminals, Jun. 2007, 3GPP TS 24.229 V8.0.0, Stage 3, (Release 8).

* cited by examiner

SERVICE BASED RELEASE OF A SUBSCRIBER REGISTRAR SERVER FROM A SIGNALLING PATH IN AN INTERNET PROTOCOL COMMUNICATION NETWORK

TECHNICAL FIELD

The present invention generally relates to an Internet Protocol, IP, communications network and, more specifically, to the release of a server from the signalling path in a communication session between a calling party and a called party in a IP communications network, such as a subscriber registrar server in an IP Multimedia Subsystem, IMS.

BACKGROUND

Voice over Internet Protocol, VoIP, is a general term for voice or speech communications and multimedia sessions over Internet Protocol, IP, networks. Other terms frequently encountered and synonymous with VoIP are IP telephony, Internet telephony, voice over broadband, VoBB, broadband telephony, and broadband phone.

VoIP systems employ session control protocols for the set-up and shut-down of communication sessions between a calling party, i.e. the party initiating the communication or call, and a called party, i.e. the party that is receiving the communication or call.

Connection related communication or signalling is generally handled in what is called a signalling domain or a control plane, separate from a content data exchange domain, generally referred as the user plane. The control plane is used by the calling and called parties to exchange control messages, for example messages to request, establish, and modify sessions. The exchange of media, for example digitized speech, audio, video, or data, between a calling party and a called party during a communication session occurs in the user plane.

Voice communication over a digitally operating IP communications network involves, among others, conversion of the analogue voice signal to a digital format and compression/translation of the signal into data packets for transmission over the IP communication network. Received data packets have to be expanded and converted back to an analogue voice signal. For producing such digital audio streams several codec's may be available, optimized for different transmission bandwidths, for example.

Users may avail themselves of a plurality of communication session related services, listed in a specific user profile, for example. Further aspects of a communication session comprise billing and provisioning of connections to communication networks external from the IP network. All or several of these aspects are processed in the control plane by different digital data servers of the IP communication network, such as subscriber registrars, also called subscriber registrar servers, Application Servers, AS, proxy servers, and the like.

The IP Multimedia Subsystem, IMS, telecommunications network is an architectural framework defined by the wireless standards body 3rd Generation Partnership Project, 3GPP, for delivering IP multimedia services to user terminals based on the Universal Mobile Telecommunications System, UMTS, network. A similar system called Multimedia Domain, MMD, was defined by the 3GPP2 for the CDMA2000 network, which was based on the 3GPP IMS. The IMS network architecture typically comprises a signalling plane or control plane and a content plane or user plane.

For network access, a user or party may connect to an IMS telecommunications network in various ways using Internet Protocols. IMS terminals, such as mobile phones, Personal Digital Assistants, PDAs, and computers, may register directly on an IMS telecommunications network, even when they are roaming in another network or country. Signalling messages in an IMS environment are exchanged using text based messaging, called Session Initiation Protocol, SIP.

Fixed access, e.g. Digital Subscriber Line, DSL, cable modems, Ethernet, mobile access, e.g. W-CDMA, CDMA2000, GSM, GPRS, and wireless access, e.g. WLAN, WiMAX, are all supported in IMS. Other phone systems like the Plain Old Telephone Service, POTS, or non IMS-compatible VoIP systems, are accessible in IMS through gateway servers.

For establishing a communication session in an IMS based VoIP network, first, in the control plane a signalling path is established between a calling party and a called party. The signalling path may involve various servers in the IMS network, for example SIP proxies, including a proxy server, such as Proxy-Call Session Control Function, P-CSCF, and subscriber registrar servers, also called Serving-Call Session Control Functions, S-CSCF, associated with both the calling party and the called party.

Typically, at least one AS is included in the signalling path for both the calling party as well as the called party, which is utilized for basic and supplementary telephone services, for example. An example of an AS server that is being developed in 3GPP is the Voice Call Continuity, VCC, Function server. Depending on the actual service, an AS can operate in a SIP proxy mode, SIP UA (User Agent) mode or SIP B2BUA (Back-to-Back User Agent) mode. Unlike a SIP proxy server, which only maintains transaction state, the B2BUA maintains complete communication session state and participates in all communication session requests. An AS server can be located in the home IMS network or in an external network, such as a third party service provider network.

In IMS an AS server is arranged for executing applications and services by manipulating SIP signalling and interfacing with other systems in the IMS telecommunications network. The AS server may also include HTTP capabilities allowing it to also perform the role of a content server for resources such as media files and VoiceXML application scripts. Typically, the AS server will offer a programming language and framework for creating new services, for example Java SIP and HTTP Servlets.

A chain of at least one subscriber registrar server and at least one application server, for both calling party and called party, is typical for an IP communication session in an IMS network.

During communication session establishment an important role is assigned to the subscriber registrar server. The subscriber registrar server applies, for example, a subscription check for invoking Value Added Services, VAS, to a communication session. Furthermore, the subscriber registrar server facilitates steps necessary for establishing the signalling path towards the called party.

To this end, the subscriber server in which the calling party is registered is arranged for, for example, applying number normalization and determining the destination network towards which the signalling path shall be established. This last step could involve domain name resolving, using Domain Name System, DNS, servers. The subscriber registrar server in which the called party is registered is arranged, among others, for registering contact address information to offer the communication session to one or more terminals of the called party.

When in the control plane a communication session is established, i.e. a session between the calling and called party is established, the active phase of the communication session involves transfer of media, such as audio, video, or data over a connection between the calling party and the called party in the user plane. Usually, the media in the user plane traverses fewer servers in the IMS network compared to the control plane. For example, in general, besides the calling terminal and the called terminal, only Media Proxies, MPs, are operative in the user plane.

Future utilization and the number of IP networks, such as IMS networks, are expected to grow gradually, due to, among others, the increasing demand for IP services of users with communication devices, such as mobile telephones. One of the challenges for operators of IP communication networks is to facilitate this increasing demand, and, at the same time, maintain or improve the reliability and robustness of the network.

SUMMARY

It is an object of the present invention to provide a method and servers arranged for improving robustness in the control plane of an IP communications network.

It is another object of the present invention to provide an IP communications system, the control plane of which operates in a more robust and optimized manner for handling network signalling traffic.

In a first aspect there is provided a method of establishing a signalling path for a communication session between a calling party and a called party in an Internet Protocol, IP, communications network. A signalling path is established between the calling party and the called party via at least one subscriber registrar server and at least one application server invoking at least one service for the communication session. The method is characterized in that at least one subscriber registrar server is at least partly released from the signalling path for the at least one invoked service.

Current IP network architectures and principles are based on persisting presence of subscriber registrar servers in the signalling path for an active communication session. However, the method disclosed above is based on the insight that for certain types of services the presence of the at least one subscriber registrar server in the signalling path between the calling party and the called party may partly or totally be superfluous, at least during the active phase of the communication session.

If another server in the IP communications network, for example an AS server, for a particular service, is capable to assume or assumes control over the communication session and may apply charging, for example, like the at least one subscriber registrar server, there is no need to maintain presence of the particular subscriber registrar server in the signalling path for the particular service. Reason is that in such case, the at least one subscriber registrar server is solely involved in establishing the signalling path of the communication session in the IP network and may therefore be released from the signalling path when the communication session is ultimately established.

Each time a server is released from a signalling path, fewer servers are involved in the signalling chain or control route between the calling and called party which improves the robustness and the reliability of the IP network as a whole. Not only because a possible source of failure is excluded but also by reducing the total signalling load of the IP network since fewer servers are present in the signalling path, thereby reducing messaging overhead, i.e. reducing the number of routing messages from and to servers.

In addition to the improved robustness of the IP network, the load of the at least one subscriber registrar server is reduced since services performed by the at least one subscriber registrar server are shifted to other server(s) in the network. Often, in IP networks, the processing load on a subscriber registrar server is the main factor that determines the quality of a network. The quality of the IP network can be regarded, for example, as the latency in and accuracy of the communication session handling by the network.

By releasing a subscriber registrar server from communication session handling during the active phase of a communication session, resources are made available for handling a substantial amount of traffic in the control plane for communication session set-up, for example. The overall efficiency of the IP network is thereby increased.

The point in time when a signalling path between parties is established depends on the type of service, i.e. depends on the type and amount of signalling messaging. In the context of the present patent application a subscriber registrar server can be released from the signalling path once the control tasks of the subscriber registrar server have been shifted to other server(s) in the IP network, for example during active phase of a communication session.

In certain situations, services performed by at least one subscriber registrar server may not be shifted to one other server in the IP network, for example an application server, but are distributed over a multitude of other servers in the IP network. In other situations, for example, only one service is performed by the at least one subscriber registrar server which is then shifted to only one other server in the IP network.

Instead of being completely released from a signalling path, communication session control of a subscriber registrar server may be partly released, for example for one path of the control plane, such as from the calling party towards the called party or the other way around. Whether the subscriber registrar server is completely or partly released may depend on the capabilities of an application server for a particular service, for example.

However, with the method disclosed above, by releasing a subscriber registrar server completely or partly form the signalling path for a particular service, a significant improvement in the robustness, reliability and efficiency of the control plane of the IP network is achieved.

In a further aspect, the at least one subscriber registrar server indicates to the at least one application server a capability for being released from the signalling path for the at least one invoked service.

In a yet further aspect, the at least one application server indicates to the at least one subscriber registrar server a capability for taking over control of the communication session by the at least one subscriber registrar server for the at least one invoked service.

That is, release of a particular subscriber registrar server is based on and results from negotiation between the subscriber registrar server and the application server. This negotiation includes indicating to each other a capability of being released from the communication session and taking over control of the communication session, respectively. Such a negotiation may involve a trust relationship between the participating servers which, for example, may be inherently present when servers of a same network operator are involved.

A trust relationship comprises, for example, a list or a table of IP-addresses or other type of identifications of application servers which are trusted for the at least one subscriber registrar server.

In an example, wherein the at least one subscriber registrar server and the at least one application server operate in IMS using SIP signalling messaging, the capability for being released from the signalling path for at least one service during the active phase of the communication session and the capability for taking over control of the communication session for the at least one service during the active phase of the communication session for a particular service are indicated in at least one of a SIP Invite message and a SIP 200 OK message. The invention is, however, not limited to these types of SIP messages, but comprises all types of SIP messages by which a signalling path can be established.

A capability for being released from a signalling path may comprise a complete or partial release of the subscriber registrar server. Note that in the context of the present patent application the capability includes both the ability of the subscriber registrar server for being released as well as the willingness of the subscriber registrar server for being released from a signalling path.

With SIP, servers involved in the communication session signalling include their identification or address, i.e. an IP address or host name address, in a record route header of a SIP message, which is sent to another server in the IMS network. Accordingly, the record route header comprises identifications or addresses of servers in the IMS network which are present in the signalling path.

Upon receiving a SIP message at an application server which message comprises an indication of capability of a subscriber registrar server for being released from the signalling path, the application server determines whether same is capable to take over the operations performed by the at least one subscriber registrar server. In the affirmative, the application server adds its identification or address, i.e. an IP address or host name address, in the record route header of the SIP message and sends it back to the subscriber registrar server. The application server further includes a capability in the SIP message of taking over control of the communication session for at least one service from the at least one subscriber registrar server.

Upon receiving this SIP message sent by the application server, the subscriber registrar server determines that it shall release itself from the signalling path. To this end, in a further example, the subscriber registrar server removes its identification or address from the record route in the SIP message and then continues with the communication session establishment process in a normal manner.

Subsequent SIP messaging following the same signalling path in the IMS network will then, therefore, not traverse via the respective subscriber registrar server, since the identification or address of this subscriber registrar server is removed from the record route in the SIP messaging.

That is, by removing its identification or address in the record route header of the SIP message, the subscriber registrar server effectively releases itself from the signalling path, such that subsequent SIP messaging in the signalling path of the IMS network will not traverse via the respective subscriber registrar server. The record route header of subsequent messages, for example a SIP Invite response message, such as a 200 Ok message, does not comprise an identification or address of the subscriber registrar server if the identification or address of the subscriber registrar server is removed from an initial SIP message, for example a SIP Invite message.

In another example, the at least one subscriber registrar server does not remove its identification or address from the record route in the SIP message, instead the removal is performed by another server, for example an application server in the IMS network in subsequent SIP messaging.

An operator of an IP communications network, for example, configures and installs services in the network and is therefore aware which services, performed by a subscriber registrar server, can be taken over by other servers in the network. The operator can determine whether a subscriber registrar server needs to remain in the signalling path during the active communication session phase. If the operator determines that operations performed by the subscriber registrar server can be taken over by other servers in the network, the presence of the subscriber registrar server in the signalling path becomes partly or totally superfluous.

Accordingly, in yet another aspect, the method comprises service invocation subscription information associated with either or both of called party and calling party, and wherein the service invocation subscription information comprises a parameter indicating a capability of the at least one subscriber registrar server for at least partly being released from the signalling path for the at least one invoked service to which the service invocation subscription information relates.

Invocation of services in an IP network is generally based on service invocation subscription information. In this aspect of the invention, the service invocation subscription information associated with a party comprises an additional service invocation parameter, indicating the capability of the at least one subscriber registrar server for at least partly being released from the signalling path for a service. The capability may be included in initial filter criteria.

In an example, the capability of the at least one subscriber registrar server includes applying record routing by the at least one subscriber registrar server, which record routing comprises one of pre-service invocation record routing and post-service invocation record routing. Record routing implies including an identification or address of a server currently processing a received message. If no record routing by a particular server is applied, the identification or address of the server is not included in the record header of the message, thereby releasing the server from the signalling path.

Note that by indicating a capability of full record routing, the at least one subscriber registrar server remains in the signalling path for a communication session between a calling party and a called party.

In another aspect, the invention comprises a subscriber registrar server for operation in an Internet Protocol, IP, communications network, the subscriber registrar server comprising signalling processing equipment arranged for establishing a signalling path for a communication session between a calling party and a called party in the communications network via at least one application server for invoking at least one service for the communication session, characterized in that the signalling messaging processing equipment is arranged for at least partly releasing the subscriber registrar server from the signalling path for the at least one invoked service.

In an example, the signalling processing equipment of the subscriber registrar server is arranged for indicating a capability for being released from the signalling path for the at least one invoked service.

In another example, for operating in IMS, the signalling processing equipment of the subscriber registrar server operates in accordance with Session Initiation Protocol, SIP, signalling for indicating the capability in at least one of a SIP invite message and a SIP 200 OK message, and for releasing the subscriber registrar server from the signalling path by removing an address of the subscriber registrar server from a record-route header in the at least one of a SIP invite message and a SIP 200 OK message.

In another aspect, the invention comprises an application server for operation in an Internet Protocol, IP, communications network, the application server comprising signalling processing equipment arranged for establishing a signalling path for a communication session between a calling party and a called party in the communications network via at least one subscriber registrar server for invoking at least one service for the communication session, characterized in that the signalling processing equipment is arranged for indicating a capability for taking over control of the communication session of the at least one subscriber registrar server for the at least one invoked service.

In an example the signalling processing equipment of the application server operates in accordance with Session Initiation Protocol, SIP, signalling and is arranged for indicating the capability for taking over control of the communication session of the at least one subscriber registrar server in at least one of a SIP invite message and a SIP 200 OK message.

The invention further provides a Home Subscriber Server, HSS, for operation in an Internet Protocol, IP, communications network comprising at least one subscriber registrar server and at least one application server for establishing a signalling path for a communication session between a calling party and a called party in the communications network, the HSS comprising a service invocation subscription information repository providing service invocation subscription information of a calling party and a called party, characterized in that the service invocation subscription information repository comprises a parameter indicating a capability of at least one subscriber registrar server for at least partly being released from the signalling path for at least one invoked service.

In an example of the HSS, the capability of the at least one subscriber registrar server includes applying record routing by the at least one subscriber registrar server, the record routing comprising one of: pre-service invocation record routing and post-service invocation record routing. No record routing involves a complete release from the signalling path.

The invention also provides for a communication system for establishing a communication session between a calling party and a called party in an Internet Protocol, IP, communications network, comprising at least one subscriber registrar server and at least one application server for invoking at least one service for the communication session, wherein the servers are arranged for establishing a signalling path for the communication session between the calling party and the called party, characterized in that the at least one subscriber registrar server and the at least one application server are arranged for at least partly releasing the subscriber registrar server from the signalling path for the at least one invoked service.

The above-mentioned and other features and advantages of the invention will be best understood from the following description referring to an IMS with SIP signalling and illustrated by the attached drawings. In the drawings. Like reference numerals denote identical parts or parts performing an identical or comparable function or operation.

The invention is in no manner limited to IMS and SIP signalling, but may be applied to any IP communication network employing session control protocols for the set-up and shut-down of communication sessions by servers in a control plane, so far as applicable.

DETAILED DESCRIPTION

Figure 1:
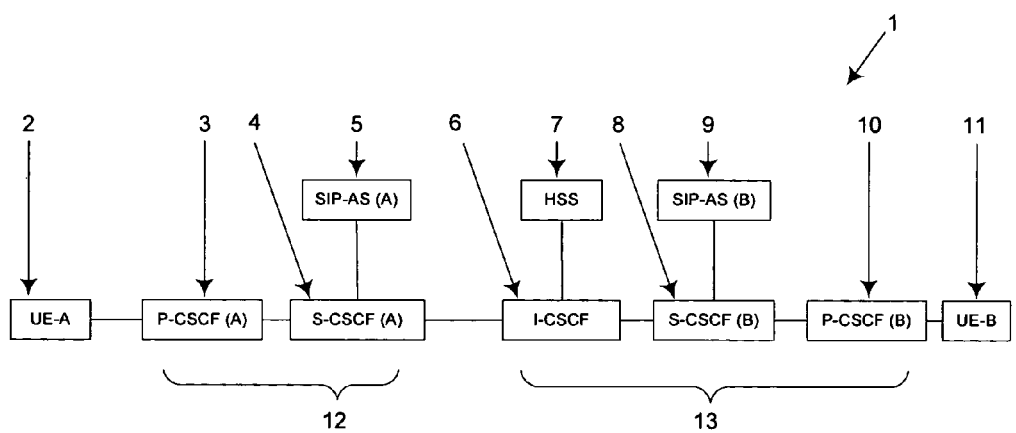
FIG. 1 is a schematic view of a prior art IMS network architecture.

FIG. 1 is a schematic view of an example of a prior art IMS network architecture 1 for a communication session between a calling party A and a called party B. The calling party or User Equipment, UE, A is indicated with reference numeral 2 and the called party or User Equipment, UE, B is indicated with reference numeral 11. A Proxy-Call Session Control Function, P-CSCF, server 3, 10 is a first server in the IMS network 1 to which a calling party A or called party B communicates. The P-CSCF 3, 10 serves as a signalling border between the (untrusted) access network of the calling party 2 or called party 11 and the IMS network 1. It further protects the IMS network 1 for unwanted access of parties that are not allowed to access the IMS network 1. The calling party 1 discovers the associated P-CSCF 3 using DHCP or the associated P-CSCF may be configured in a static manner.

The IMS network 1 further comprises a subscriber registrar server 4, 8 which acts as a Subscriber-Call Session Control Function, S-CSCF. The subscriber registrar server 4, 8 is a central server in the control plane of the IMS network 1. It is arranged for, among many others, handling SIP registrations of parties 2, 11 which allows it to bind the user location of the parties 2, 11 and for deciding to which application server(s) SIP messages are forwarded.

SIP Application servers 5, 9 are usually also present in an IMS network 1, which are utilized, among others, for execution of supplementary services for the communication session, such as Call Hold, Call Waiting, Call transfer etc. The Application server 5, 9 may monitor the communication session duration and apply communication session limit related to charging. The Application server 5 may also allow or disallow a request for a change in the user plane, for example an upgrade from voice to voice and audio and charging of communication sessions.

An Interrogating-Call Session Control Function server 6 is a server acting on the main name domain of the IMS network 1. It is arranged to query a Home Subscriber Server, HSS, 7 to retrieve the address of the subscriber registrar server, S-CSCF, 8 in which a called party 11 is registered. It is also arranged to notify the HSS 7, at the time of subscriber registration, in which subscriber registrar server, S-CSCF, 4, 8 the calling party 2 or the called party 11 is registered.

The combination of P-CSCF 3, subscriber registrar server, S-CSCF, 4 and the AS 5 associated with the calling party 2 is construed as the IMS network associated with the calling party 2. The combination of the P-CSCF 10, subscriber registrar server, S-CSCF, 8, application services, AS, server 9, I-CSCF 6 and the HSS 7 is construed as the IMS network part associated with the called party 11.

Figure 2:
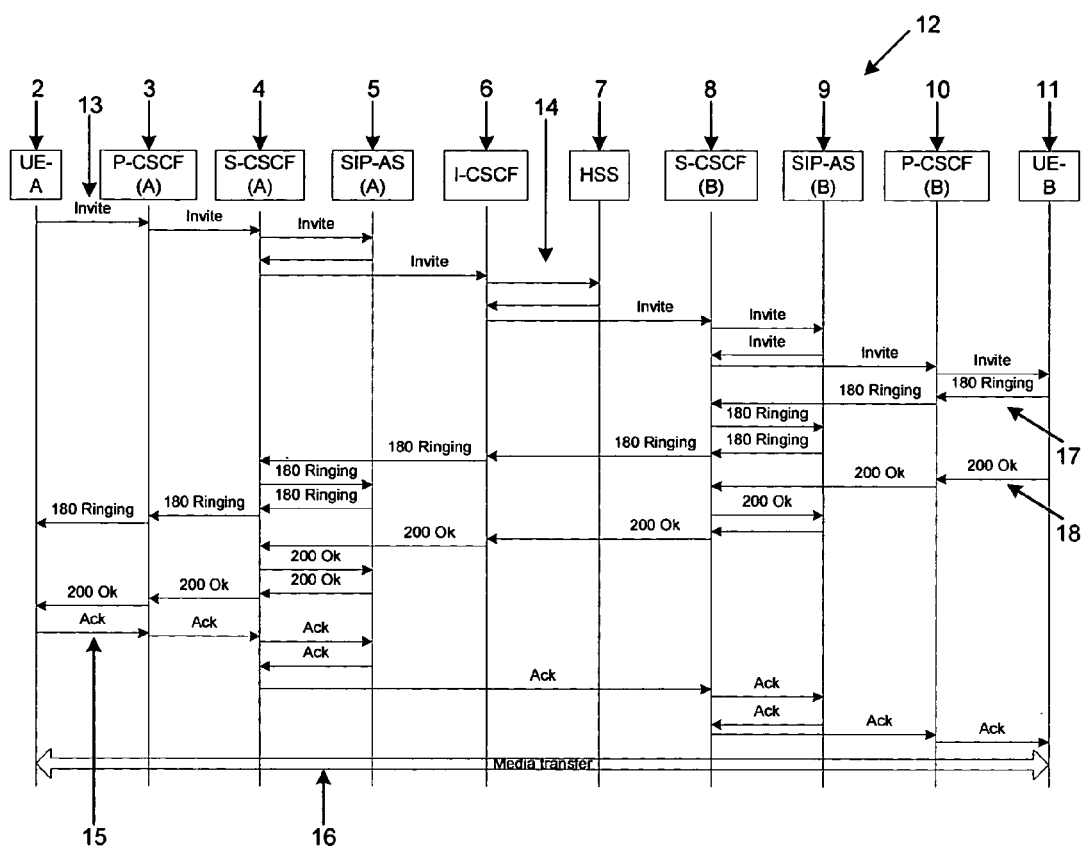
FIG. 2 is a schematic view of a method of establishing a communication session between a calling party and a called party in the IMS network according to FIG. 1.

FIG. 2 is a schematic view of a method of establishing a communication session 12 between a calling party 2 and a called party 11 in a control plane of the IMS network 1 according to FIG. 1. Here, the calling party 2 initiates a communication session by sending a SIP Invite 13 message to its associated P-CSCF 3. The SIP Invite 13 message comprises an identification of the called party 2.

The P-CSCF 3 performs, among others, a security check and forwards the SIP Invite 13 to the Subscriber registrar server 4 associated with the calling party 2. The subscriber registrar server, S-CSCF, 4 further applies, for example, number normalization and domain name resolving, if needed. The SIP Invite 13 message is, in the example communication session case of FIG. 2, further routed via the Application server 5.

The SIP Invite 13 message is then forwarded to an Interrogating-Call Session Control Function, I-CSCF, 6 which acts as a main inbound proxy for a domain name for the called party 11. The I-CSCF queries 14 the HSS 7 for the location of the called party 11. Upon receiving the location information answer 14 from the HSS 7, the I-CSCF 6 forwards the SIP Invite 13 message to the subscriber registrar server 8 associated with the called party 11.

The S-CSCF 8 routes the SIP Invite 13 message, via application server 9 and via the P-CSCF 10 to the called party 11. The application server 5 and the P-CSCF 3, associated with the calling party 2, may perform similar tasks or services as compared to the ones associated with the called party 11.

When the SIP Invite 13 message has reached the called party 11, a 180 Ringing response message 17 is sent from the called party 11 towards the calling party 2 via the same signalling path as the originating SIP Invite 13 message, but in reversed direction. The 180 Ringing message 17 is sent to inform the calling party 2 that the called party 11 has been reached by the SIP Invite 13 message and that the called party's terminal has reached the alerting stage.

After the called party 11 has answered to the SIP Invite 13 message, indicating that it accepts the communication session, a 200 OK response message 18 is sent from the called party 11 to the calling party 2 in the same signalling path as the SIP Invite 13 message and the 180 Ringing response message 17. Upon receiving the 180 Ringing response message 17 at the calling party 2, the calling party 2 sends an Acknowledgement, Ack, message 15 towards the called party 11 after which the media transfer 16 between calling party and called party commences. The media 16 travels a different route, over a user plane in the IMS network 1. Usually such a route is more direct and traverses fewer servers or nodes in the IMS network 1 than the signalling path followed by the messages exchanged in the control plane.

Figure 3:
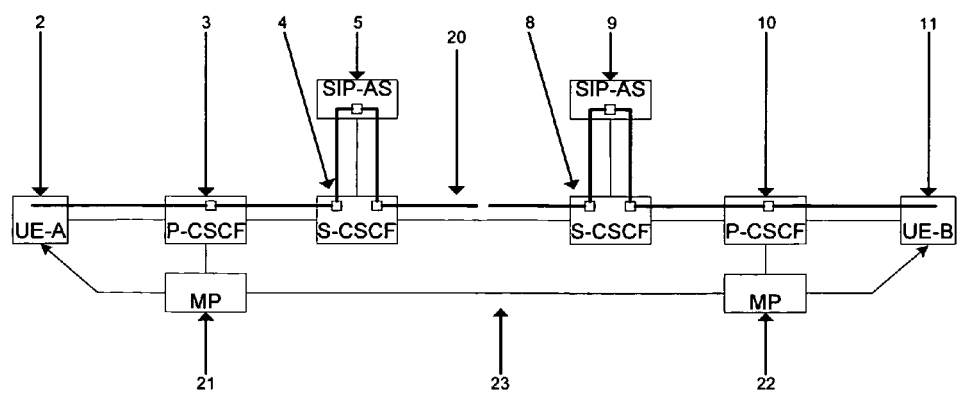
FIG. 3 is a schematic view of a signalling path and a user plane in an IMS network according to FIG. 1 during an active phase of a communication session between a calling party and a called party.

FIG. 3 is a schematic view of a signalling path 20 and a content path 23, during active phase of a communication session between the calling party 2 and the called party 11. During the active phase of a communication session in an IMS network 1, the SIP messages traverse a different route compared to the communication session establishment phase depicted in FIG. 2. Here, the calling party 2 sends SIP messages via its associated P-CSCF 3 directly to the subscriber registrar server S-CSCF 4 associated with the called party 11.

The subscriber registrar server 4 sends the SIP messages to the subscriber registrar server 8 associated with the called party 11, after the SIP messages have traversed the Application services AS servers 5. SIP messages do not traverse I-CSCF 6 as was the case during communication session establishment, as depicted in FIG. 2. The SIP messages, then, traverse via the P-CSCF 10 to the called party 11. The same route is taken for SIP messages from the called party 11 to the calling party 2, but then in a reverse direction.

Using the user plane, i.e. the user plane 23 in IMS, media or data 'travels' from the calling party 2 through a Media Proxy, MP, 21 associated with the calling party 2, to an MP 22 associated with the called party 11 and vice versa.

Figure 4:
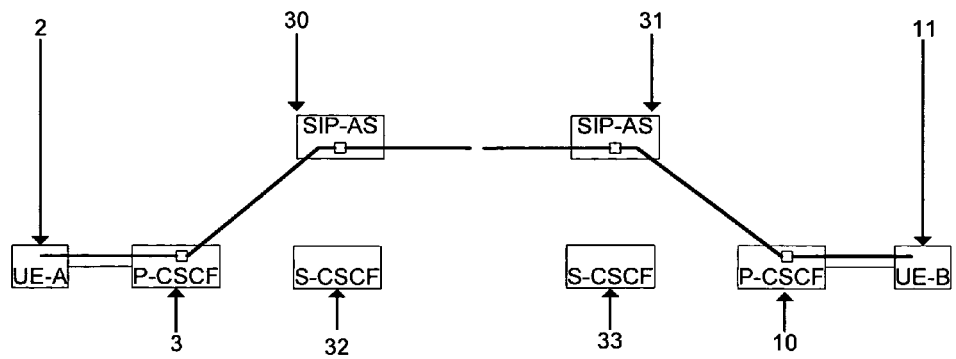
FIG. 4 is a schematic view of an established signalling path of a communication session between a calling party and a called party in an IMS network according to an example of the invention.

FIG. 4 is a schematic view of an established signalling path of a communication session between a calling party 2 and a called party 11 in an IMS network according to an example of the invention. Similar to FIG. 3, a signalling path is established between a calling party 2 and a called party 11. However, SIP messages sent from the calling party 2 are sent directly to the application server 30 associated with the calling party 2 via the P-CSCF 3.

Here, the subscriber registrar servers 32, 33 associated with the calling party 2 and the calling party 11, respectively, no longer reside in the signalling path between the calling party 2 and the called party 11. The subscriber registrar servers 32, 33 are released from an initially established signalling path for a communication session following the present invention, as will be explained in more detail hereafter.

Figure 5:
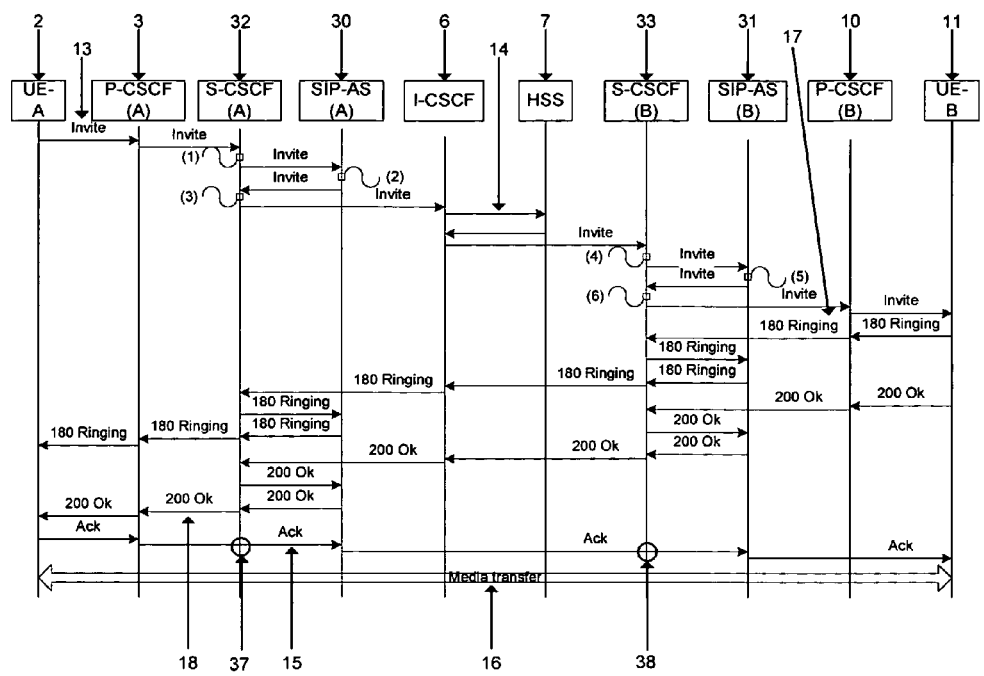
FIG. 5 is a schematic view of an example of a method of establishing a communication session between a calling party and a called party in an IMS network according to an example of the invention.

FIG. 5 is a schematic view of an example of establishing a communication session between a calling party 2 and a called party 11 in an IMS network according to a method of the invention. Here, again, the calling party 2 initiates a communication session by sending a SIP Invite 13 message via its associated P-CSCF 3 to its associated subscriber registrar server, S-CSCF, 32.

Upon receiving the SIP Invite 13 message, the subscriber registrar server 32 prepares itself for record routing, i.e. it includes its own IP address, its domain name or other suitable identification as a record route header in the SIP Invite 13 message. The subscriber registrar server sever 32 also indicates that it supports to be released from the signalling path, for example by including a 'Supported: SCSCF_Release' header in the SIP Invite 13 message, for at least one service. The SIP Invite 13 message is then forwarded to the application services AS server 30.

The application server 30 also prepares itself for record routing, i.e. it includes its own IP address, its domain name or other suitable identification as a record route header in the SIP Invite 13 message. The application server 30 further determines that same is able to take over control of the communication session from the subscriber registrar server 32 for at least one service, for which the subscriber registrar server 32 has indicated that it supports to be released from the signalling path.

Therefore, the presence of the subscriber registrar server 32 in the signalling path between the calling party 2 and the called party 11 becomes superfluous for that communication session. The application server 30 indicates in the SIP Invite 13 message that it is able to take over the communication session from the subscriber registrar server 32, for example by including a 'Require: SCSCF_Release' header in the SIP Invite 13 message, and forwards the SIP Invite 13 message to the subscriber registrar server 32.

Upon receiving the SIP Invite 13 message, the subscriber registrar server 32 determines that it shall release itself from the signalling path between the calling party 2 and the called party 11. To do so, the subscriber registrar server 32, for example, removes its IP address, or other identification, from the record route header in the SIP Invite 13 message and, for example, removes the 'Supported:SCSCF_Release' bit as well as the 'Require:SCSCF_release' bit. By doing so, the record route header in the SIP Invite 13 message no longer contains the IP address or other identification of the subscriber registrar server 32.

SIP messages related to subsequent SIP transactions for this communication session travel the route comprised in the record route header of the SIP Invite 13 message and, since the IP address or other type of identification of the subscriber registrar server 32 is removed from the record route header, the subscriber registrar server 32 is, effectively, released from the signalling path. The communication session establishment method continues using standard SIP routing methodology, for example as explained in the accompanying text of FIG. 2. It is understood that the record route header is copied by the receiver of the SIP Invite message, into the SIP response message that is sent towards the sender of the SIP Invite message.

The I-CSCF 6, the location information request & answer 14 and the HSS 7 are all used in a same manner as explained in the accompanying text of FIG. 2. The subscriber registrar server 33 associated with the called party 11 and its corresponding application server 31 all negotiate the release of the subscriber registrar server 33 in a same manner as explained above for the calling party 2. Finally, the SIP Invite 13 message reaches the called party via the P-CSCF 10.

Again a 180 Ringing response message is sent from the called party 11 as well as a 200 OK message 18 after the called party 11 has indicated that it accepts the communication session. The acknowledgement Ack message 18 sent by the calling party 2 does not follow the same route as the SIP Invite 13 message.

The Ack message 15 travels directly from the P-CSCF 3 to the application server 32 associated with the calling party 2. The Ack message does not traverse the subscriber registrar server 32 as indicated with reference numeral 37. The same applies for the subscriber registrar server 33 associated with called party 11 as indicated with reference numeral 38. Upon receiving the Ack message 15 by the called party 11, media or data is transferred over a user plane or media plane 16. For the remainder of the communication session the subscriber registrar servers 32, 33 are not present in the signalling path between the calling party 2 and the called party 11.

Figure 6A:
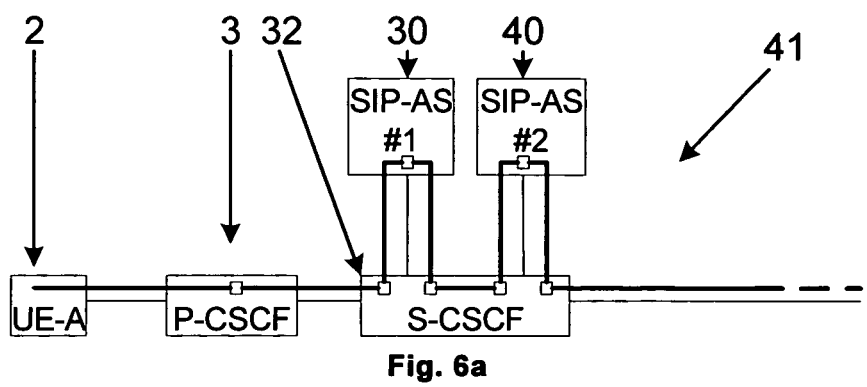
FIGS. 6a and 6b both depict a communication session case in an IMS network according to an example of the present invention.
Figure 6B:
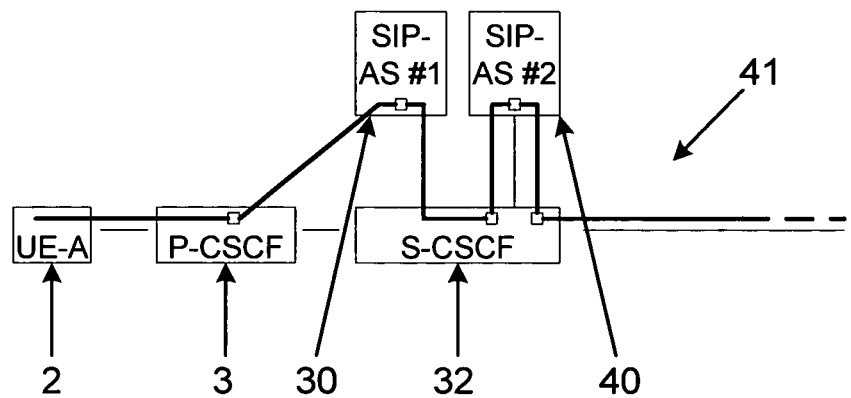

FIGS. 6a and 6b both depict a communication session case in an IMS network according to an example of the present invention. In the signalling path 41, the SIP messages traverse two application servers 30, 40 associated with the subscriber registrar server S-CSCF 32. During communication session establishment, SIP messaging are routed via both application servers 30, 40, which may be arranged to perform different tasks.

When during communication session establishment it is decided that the application server 30 is able to take over control of a communication session from the subscriber registrar server 32 for at least one service, the subscriber registrar server 32 may be partly released from the signalling path 41 during the active phase of the communication session.

FIG. 6b depicts the signalling path 41 during the active phase of the communication session, wherein SIP messages are directly transmitted between the application server 30 and the P-CSCF 3. For certain services, for example, it is not possible to take over control of the communication session by another application server 40 from the subscriber registrar server 32. In such a case, the subscriber registrar server 32 will remain in the signalling path, at least for these services, as illustratively shown.

Figure 7A:
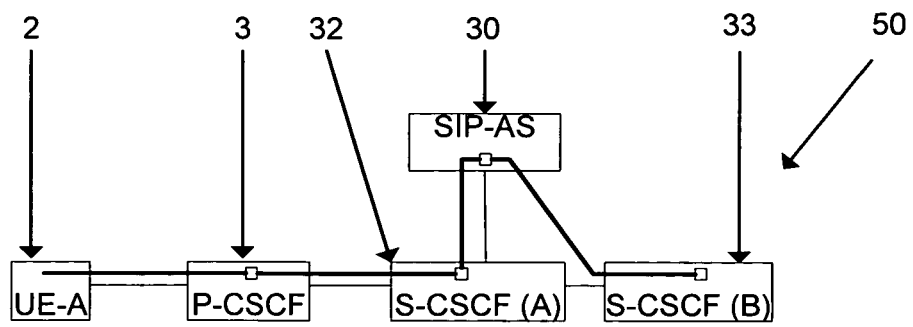
FIGS. 7a and 7b both depict an example of a signalling path for a communication session during active phase of a communication session according to an example of the invention.
Figure 7B:
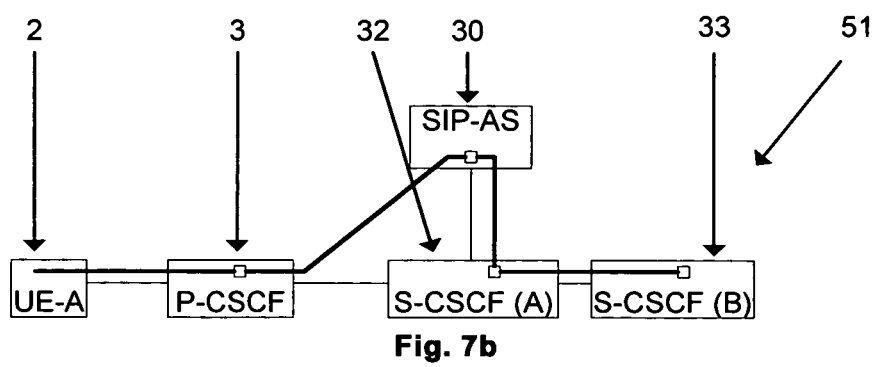

FIGS. 7a and 7b both depict an example of a signalling path for a communication session during active phase of a communication session according to an example of the invention. FIG. 7a shows an example of a pre-service invocation record routing, wherein the subscriber registrar server 32 is partly released from the signalling path of an IMS network 1. Here, SIP messages traverse directly the subscriber registrar server 33 associated with the called party and the application server 30, without the presence of the subscriber registrar server 32 associated with the calling party 2. The subscriber registrar server 32, however, is still present in the signalling path. That is, SIP messages exchanged between the P-CSCF 3 and the application server 30 traverse the subscriber registrar server 32.

Invocation of services in IMS is based on subscription information, the so-called Initial Filter Criteria, IFC, or service invocation subscription information. IFC consists of a set of conditions, indicating for which initial SIP request messages, such as Invite or Message, an IMS service shall be invoked. The address of the application server hosting the IMS service is also included in the IFC. The IFC forms part of the subscriber profile in HSS and is sent from HSS to subscriber registrar server S-CSCF, when that S-CSCF is (temporarily) assigned to that subscriber. This, for example, may occur during IMS registration by that subscriber.

The operator installs and configures the IMS services in its network and will therefore know which IMS services have the capability to assume control of a communication session without the need for further S-CSCF involvement in that communication session. The operator is, by virtue of being in control of provisioning IFCs, in control of which IMS services are invoked for the subscribers. The IMS service(s) that will be invoked for a communication session is/are provisioned by the operator into the IFC of a subscriber. The operator will therefore be able to determine, when provisioning the IFC for a subscriber, whether it will be needed for the S-CSCF to remain in the signalling path when the IMS service as indicated in the IFC, is invoked.

Different from the above-disclosed negotiation between the subscriber registrar server and the application server, in a further example a parameter is included in the service invocation subscription information IFC, indicating a capability of a subscriber registrar server to be released from the signalling path of a communication session, or for being at least partly released from the signalling path for the particular service.

Release of a subscriber registrar server from a signalling path is then accomplished by adaptive record routing, including pre-service invocation record routing, post-service invocation record routing, and no record routing.

FIG. 7b shows an example of a post-service invocation record routing 51. Here SIP messages traverse directly the P-CSCF 3 and the application server 30, without the presence of the subscriber registrar server 30 associated with the calling party 2 in the signalling path between P-CSCF 3 and the application server 30.

Figure 8:
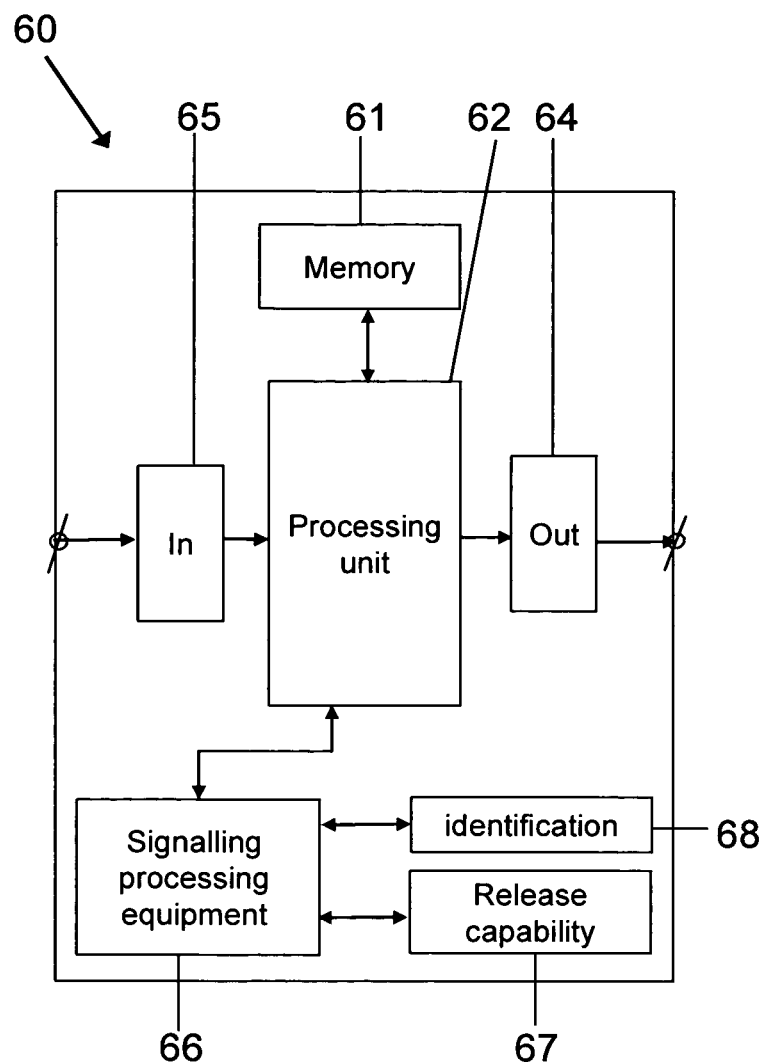
FIG. 8 is a schematic view of a subscriber registrar server according to an example of the present invention.

FIG. 8 shows a schematic example of a subscriber registrar server 60 for use in an IP communications network.

The subscriber registrar server 60 comprises a memory 61, an IP network input and output unit 64, 65 having an input and output for receiving and sending signalling messages, and signalling processing equipment 66, all connected to a processing unit 62.

The signalling processing equipment 66 is arranged for establishing a signalling path for a communication session between a calling party and a called party in an IP network. The signalling processing equipment 66 is arranged to retrieve a capability 67 whether the server 60 supports for being released from the signalling path for a particular service. The identification 68 comprises, for example, the IP address of the subscriber registrar server 60.

Figure 9:
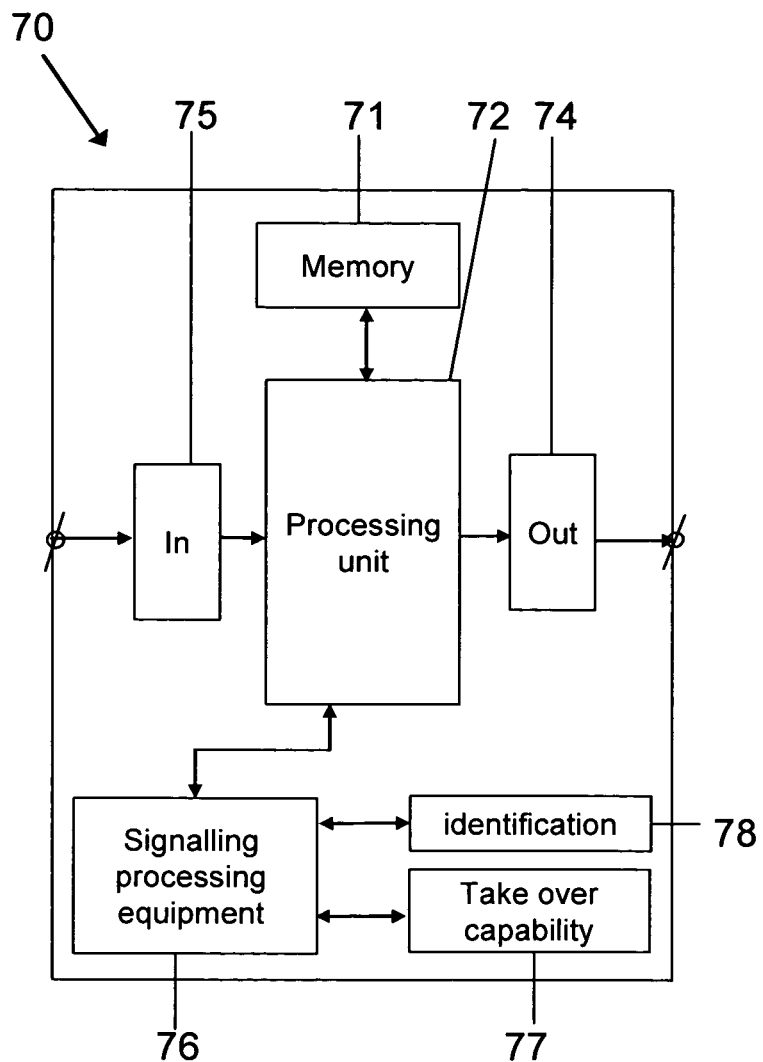
FIG. 9 is a schematic view of an application server according to an example of the present invention.

FIG. 9 is a schematic example of an architecture of an application server 70 for use in an IP communications network.

The application server 70 comprises a memory 71, an IP network input and output unit 74, 75 having an input and output for receiving and sending signalling messages, and signalling processing equipment 76, all connected to a processing unit 72.

The signalling processing equipment 76 is arranged for establishing a signalling path for a communication session between a calling party and a called party in an IP network. The signalling processing equipment 76 is arranged to retrieve a capability 77 whether the application server is able to take over control of a communication session from a subscriber registrar server for a particular one service. The identification 78 comprises, for example, the IP address of the application server 70.

Figure 10:
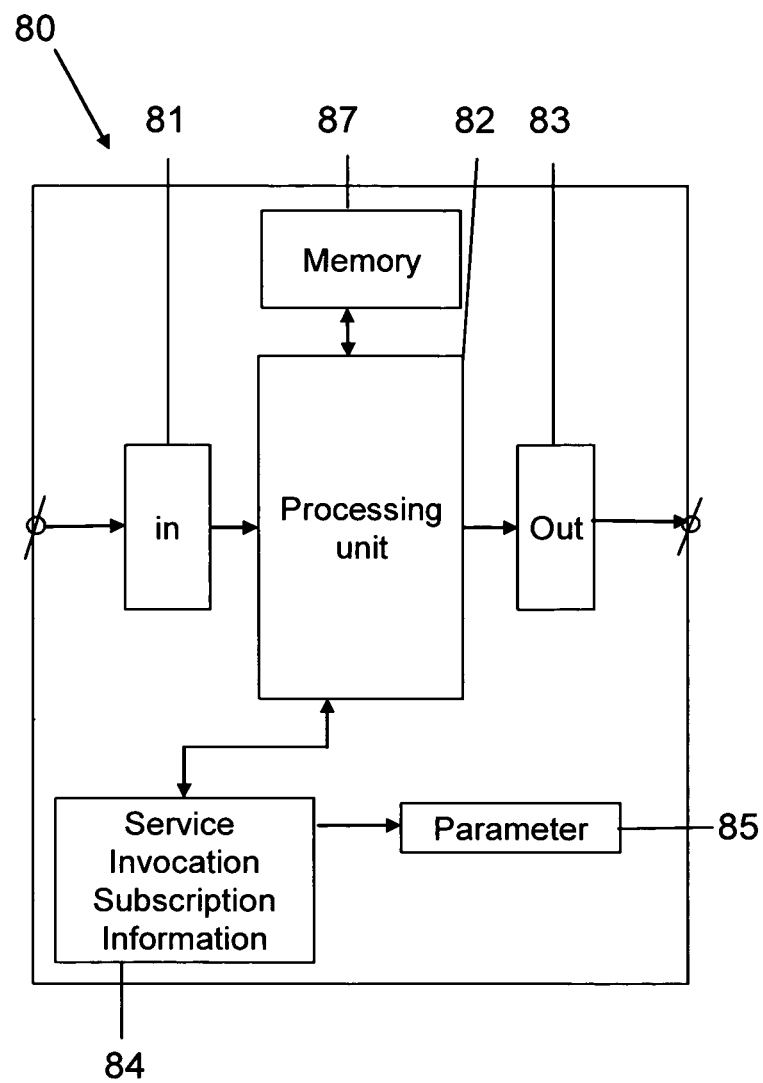
FIG. 10 is a schematic view of a Home Subscriber Server, HSS, according to an example of the present invention.

FIG. 10 shows a schematic example of a Home Subscriber Server, HSS, 80 for operation in an IMS network for example.

The HSS 80 comprises a memory 87, an IP network input and output unit 81, 83 having an input and output for receiving and sending signalling messages, and service invocation subscription information repository 84, all connected to a processing unit 82.

The service invocation subscription information repository 84 comprises a parameter 85 indicating a capability of a subscriber registrar server for at least party being released from a signalling path for at least one service 86. This parameter is not just contained in the repository, it forms part of a subscriber's service invocation subscription information. Each instance of service invocation subscription information may contain such a parameter.

The invention is not limited to the embodiments described, but can be practiced with modification and alteration within the spirit and scope of the appended claims.

The invention claimed is:

1. A method of establishing a signaling path for a call between a calling party and a called party in an Internet Protocol (IP) communications network, the method comprising:

establishing the signaling path between respective user equipment of the calling party and the called party via at least one subscriber registrar server and at least one application services server invoking at least one service for the call;

indicating, by the at least one subscriber registrar server to the at least one application services server, a capability for being released from the signaling path for the at least one service;

after the call has been established and while the call is in an active phase, at least partly releasing the at least one subscriber registrar server from the signaling path for the at least one service;

wherein the respective user equipment are each disjoint from:
the at least one subscriber registrar server; and
the at least one application services server.

2. The method of claim 1:

wherein the at least one subscriber registrar server and the at least one application services server operate in an IP multimedia Subsystem (IMS) using Session Initiation Protocol (SIP) signaling messaging;

wherein the capability for being released from the signaling path for the at least one service is indicated in at least one of a SIP Invite message and a SIP 200 OK message.

3. The method of claim 2, wherein releasing the at least one subscriber registrar server from the signaling path comprises removing an address of the at least one subscriber registrar server from a record-route header in the SIP messaging.

4. The method of claim 1, further comprising the at least one application services server indicating, to the at least one subscriber registrar server, a capability for taking over control of the call by the at least one subscriber registrar server for the at least one service.

5. The method of claim 4:

wherein the at least one subscriber registrar server and the at least one application services server operate in an IP multimedia Subsystem (IMS) using Session Initiation Protocol (SIP) signaling messaging;

wherein the capability for taking over control of the call for the at least one service is indicated in at least one of a SIP Invite message and a SIP 200 OK message.

6. The method of claim 1:

wherein service invocation subscription information is associated with each of the called and calling party;

wherein the service invocation subscription information comprises a parameter indicating the capability.

7. The method of claim 6, wherein the capability includes applying record routing by the at least one subscriber registrar server, the record routing comprising one of: pre-service invocation record routing, post-service invocation record routing, and no record routing.

8. A subscriber registrar server for operation in an Internet Protocol (IP) communications network, the subscriber registrar server comprising:

signaling processing equipment configured to:
establish a signaling path for a call between respective user equipment of a calling party and a called party in the communications network via at least one application services server for invoking at least one service for the call;

indicate a capability for being released from the signaling path for the at least one service;

after the call has been established and while the call is in an active phase, at least partly release the subscriber registrar server from the signaling path for the at least one service;

wherein the respective user equipment are each disjoint from:
the subscriber registrar server; and
the at least one application services server.

9. The subscriber registrar server of claim 8, wherein the signaling processing equipment operates in accordance with Session Initiation Protocol (SIP) signaling for:
indicating the capability in at least one of a SIP Invite message and a SIP 200 OK message;
releasing the subscriber registrar server from the signaling path by removing an address of the subscriber registrar server from a record-route header in the at least one of a SIP Invite message and a SIP 200 OK message.

10. An application services server for operation in an Internet Protocol (IP) communications network, the application services server comprising:
signaling processing equipment configured to:
establish a signaling path for a call between respective user equipment of a calling party and a called party in the communications network via at least one subscriber registrar server for invoking at least one service for the call;
receive, from at least one of the subscriber registrar servers, an indication of a first capability for being released from the signaling path for the at least one service;
indicate a second capability, after the call has been established and while the call is in its active phase, for taking over control of the call of the at least one subscriber registrar server for the at least one service;
wherein the respective user equipment are each disjoint from:
the at least one subscriber registrar server; and
the application services server.

11. The application services server of claim 10, wherein the signaling processing equipment:
operates in accordance with Session Initiation Protocol (SIP) signaling;
is configured to indicate the second capability for taking over control of the call of the at least one subscriber registrar server in at least one of a SIP Invite message and a SIP 200 OK message.

12. A Home Subscriber Server for operation in an Internet Protocol (IP) communications network comprising at least one subscriber registrar server and at least one application services server for establishing a signaling path for a call between a calling party and a called party in the communications network, the Home Subscriber Server comprising:
a non-transitory service invocation subscription information repository configured to provide service invocation subscription information of a calling party and a called party using respective user equipment for which the signaling path of the call is established via the at least one application services server and the at least one subscriber registrar server;
wherein the service invocation subscription information provided by the repository comprises a parameter indicating a capability of at least one subscriber registrar server for at least partly being released, after the call has been established and while the call is in an active phase, from the signaling path for at least one service;
wherein the respective user equipment are each disjoint from:
the at least one subscriber registrar server; and
the at least one application services server.

13. The Home Subscriber Server of claim 12, wherein the capability of the at least one subscriber registrar server includes applying record routing by the at least one subscriber registrar server, the record routing comprising one of: pre-service invocation record routing, post-service invocation record routing, and no record routing.

14. A communication system for establishing a call between a calling party and a called party in an Internet Protocol (IP) communications network, the system comprising:
at least one subscriber registrar server comprising first signaling processing equipment;
at least one application services server comprising second signaling processing equipment configured to invoke at least one service for the call;
wherein the first and second signaling processing equipment are configured to:
establish a signaling path for the call between respective user equipment of the calling party and the called party via the at least one subscriber registrar server and the at least one application services server;
at least partly release, after the call has been established and while the call is in an active phase, the subscriber registrar server from the signaling path for the at least one service;
wherein the first signaling processing equipment is configured to indicate, to the second signaling processing equipment, a capability for being released from the signaling path for the at least one service;
wherein the respective user equipment are each disjoint from:
the at least one subscriber registrar server; and
the at least one application services server.

15. The method of claim 1, wherein the at least partly releasing of the at least one subscriber registrar server from the signaling path comprises entirely releasing the at least one subscriber registrar server from the signaling path such that the signaling path is no longer via the at least one subscriber registrar server.

* * * * *